United States Patent Office 2,780,710
Patented Feb. 5, 1957

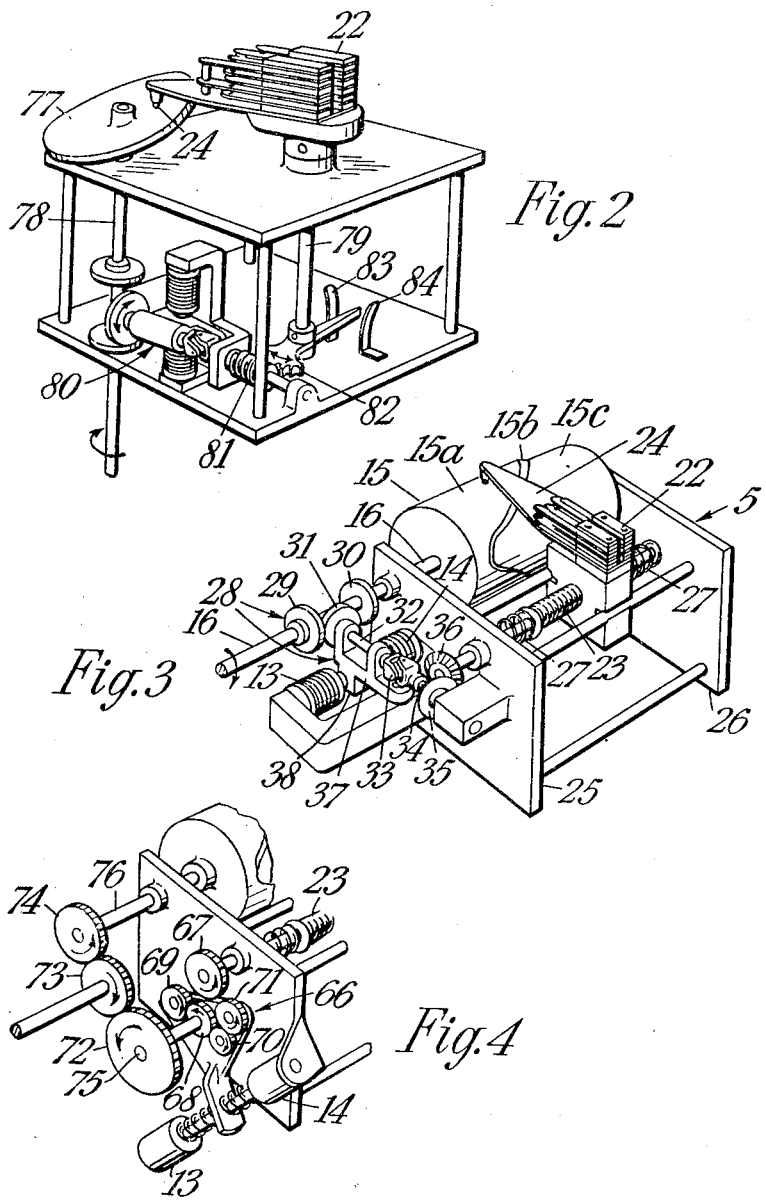

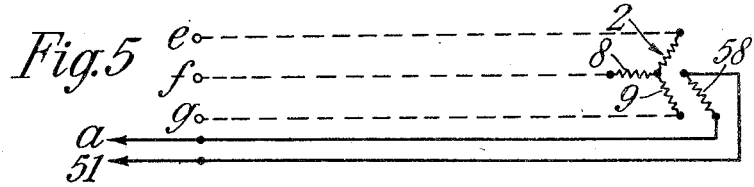
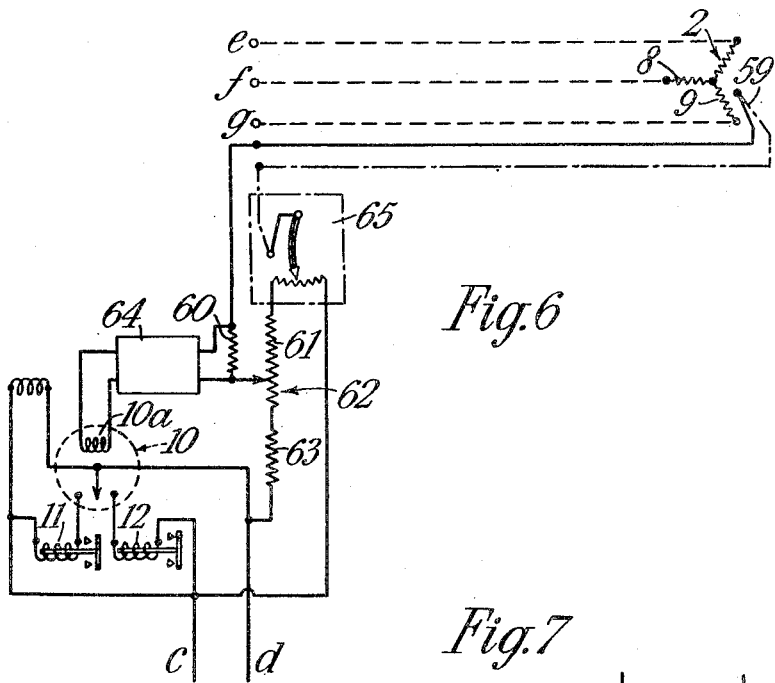
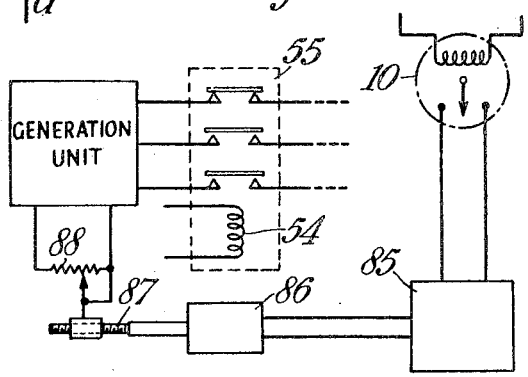

2,780,710

APPARATUS FOR REGULATING THE TEMPERATURE OF ELECTRICALLY HEATED ELEMENTS

Ernest Frederick Powell, Wylde Green, and Sidney Walter Gough, Sutton Coldfield, England, assignors to Dunlop Rubber Company Limited, London, England, a British company Application May 3, 1952, Serial No. 285,978

19 Claims. (Cl. 219—20)

This invention relates to apparatus for regulating the temperature of electrically heated elements and more particularly for regulating electrically heated elements used in aeroplane de-icing equipment.

In order to obtain satisfactory de-icing by means of electrically heated elements, it is necessary that the wattage dissipated per unit area of the element should be high, e. g. of the order of 15–20 watts per square inch. However, if an aircraft in which the elements are supplied with an amount of power sufficient to effect de-icing, passes, without any reduction in the power supplied to the elements, from icing conditions into an area in which no icing takes place, the temperature of the elements may rise to such a value that they burn out and this in fact frequently occurs.

It is an object of the present invention to provide apparatus for regulating the temperature of an electrically heated element whereby the temperature of the element is maintained within a predetermined range.

According to the invention apparatus for regulating the temperature of an electrical heating element comprises a two-way relay, means responsive to the temperature of the element for controlling the direction of flow of a current through the relay and means operable by the relay and connected in the element supply circuit for automatically adjusting the circuit so as to control the amount of electrical energy per unit time supplied to the element whereby the temperature thereof is maintained within a predetermined range.

Preferably the temperature responsive means comprises an electrical bridge network incorporating the element, and a three-position multiple change-over switch for alternatively switching the element for a predetermined length of time onto a power supply for the element and for subsequently switching the element into circuit with the bridge and simultaneously energising the bridge so that an increase or decrease in the resistance (temperature) of the element beyond a predetermined range can cause a current to flow in one direction or another through the relay coil which closes one or other of the circuits for adjusting a switching mechanism whereby the amount of electrical energy per unit time subsequently supplied through the switching mechanism is such that the temperature of the element is maintained within a predetermined range.

In one construction, the direction of flow of the above-mentioned current is detected by means of a moving coil relay, the relay actuating a cam-operated switching mechanism for pulse feeding the elements with electrical power whereby the make-to-break time ratio of the mechanism is either increased or decreased according to the signal from the relay so that the amount of electrical energy per unit time subsequently supplied to the elements is adjusted to the amount required.

In an alternative arrangement the temperature sensing means instead of comprising the heating element itself may comprise a length of resistance wire the resistance value of which varies according to its temperature, the said wire being located proximate to the heating element. This is a convenient arrangement when the heating element itself is made of a material such as Constantan which has a negligible temperature coefficient of resistance. "Constantan" is a copper-nickel alloy containing 10 to 55% nickel having constant electrical resistivity irrespective of temperature and is used for electrical resistance thermocouples, usually in connection with copper. The resistance wire may be incorporated by switching means into the bridge network after the manner referred to in the paragraph above.

In a further alternative arrangement the temperature sensing means comprises a thermo-couple for measuring the temperature of the element, the current set up by the thermo-couple being caused to operate a relay for adjusting the switching mechanism after the manner to be later described.

In a still further alternative arrangement the signal from the relay may be utilised to adjust a servo-operated variable resistance connected in series with means for controlling the supply to the element whereby the supply voltage is adjusted in response to the signal. The supply voltage in this instance may be either continuous or in the form of short pulses of either direct or alternating current.

The invention will now be described with reference to the accompanying drawings in which Figure 1 illustrates diagrammatically an existing de-icing system modified so as to incorporate temperature regulating apparatus in accordance with the invention.

Figure 2 illustrates a multiple switch and actuating mechanism therefor.

Figure 3 illustrates a multiple switch and an alternative actuating mechanism therefor Figure 4 illustrates a further alternative actuating mechanism.

Figure 5 illustrates diagrammatically an alternative temperature sensing system.

Figure 6 illustrates diagrammatically a further alternative temperature sensing system.

Figure 7 illustrates a circuit for a servo-operated variable resistance controller.

Figure 1:
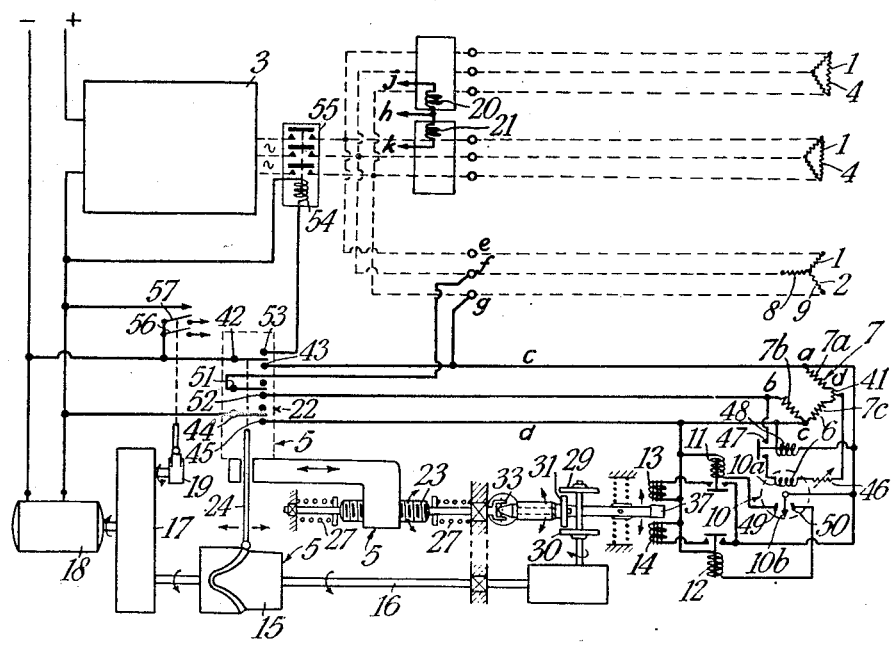

The circuit and apparatus illustrated in Figures 1 and 3 and showing a de-icing system wherein a proportion of the electrically heated de-icing elements 1 making up a de-icing unit are cyclically heated, will now be described.

The de-icing units are made up from a plurality of bars 2 arranged in grid formation and star-connected to a supply of alternating current 3 and of a plurality of mats 4 located between the spaces formed between the bars and delta-connected to the supply of alternating current 3. In the existing unmodified arrangement the star-connection bars 2 are continuously heated and the delta-connected mats 4 are cyclically heated on a one minute "on," seven minutes "off" cycle.

The de-icing action of this unit is as follows. Ice forming on the unit is caused to form in discrete blocks over the surfaces of the mats, but is unable to form over the surfaces of continuously heated bars. The ice forming on the mats is melted off cyclically when the mats are heated.

In the apparatus now to be described the power supply to the de-icing unit (mats 4 and bars 2) is interrupted— for a period of e. g. 3 to 17 seconds as will be more fully described later—by means of an adjustable cam switching unit 5, the switching unit then operating in order to switch into circuit a temperature sensing unit 6 comprising a resistance bridge network 7 one arm of which is formed by two phases 8 and 9 of the star-connected bars of one de-icing unit. If the temperature of the bar 2 falls outside a predetermined range an out-of-balance current is obtained from the bridge 7 which operates a moving coil relay 10 in order to provide a "temperature high" or "temperature low" signal. The "high" or "low" signal actuates one or other of a pair of relays (11 or 12) which operate solenoids 13 or 14 which themselves operate a mechanism to be more fully described later which adjusts the switching unit 5 whereby the make-to-break time ratio of the cyclically heated mats and bars is increased or decreased accordingly.

The switching unit 5 after a predetermined length of time disconnects the temperature sensing unit 6 and reconnects the de-icing unit to the alternating current supply unit 3.

The apparatus will now be more particularly described. The adjustable-cam switching unit 5 (see Fig. 3) comprises a cylindrical cam 15 mounted on a shaft 16 supported at each end by bearings mounted in the support plates 25 and 26 Fig. 3. The shaft 16 is drivably connected to a reduction gear box 17 Fig. 1 which is driven by an electric motor 18, the gear box also providing the drive to an existing cam-operated interrupter 19 provided for interrupting, by means of relays 20 and 21, the A. C. current supplied to the mats 4. A multiple switch 22 mounted on a traversing shaft 23 driven through a reversing device 28 to be later described, is actuated by means of a cam follower 24 which engages the surface of the cylindrical cam 15. The cam 15 is provided with a cam profile formed with three distinct levels (15a, 15b and 15c) so that the multiple switch 22 can be moved into three different positions.

The traversing shaft 23 is mounted in bearings supported by the plates (25 and 26) in parallel relationship to the cam 15. The traversing shaft is screw-threaded along a portion of its length corresponding substantially to the width of the cam and carries the multiple switch upon the screw thread. At each end of the shaft within the side plates 25 and 26 the shaft is provided with a co-axial coiled compression spring 27.

The reversing device 28 will now be described. The device comprises a pair of discs 29 and 30 rigidly attached to the shaft 16 in spaced apart relationship. A third disc 31 is rigidly attached to one end of a shaft 32 having its axis of rotation at right angles to that of the shaft 16. The shaft 32 is drivably connected by means of a universal joint 33 to a stub shaft 34 having a bevelled crown wheel 35, this wheel mating with a crown wheel 36 rigidly attached to the traversing shaft 23. The shaft 32 is provided with an armature 37 within which the shaft 32 is rotatable, the armature having an extension 38 located between the solenoids 13 and 14, the solenoid 13 moving the armature so as to engage the disc 31 with the disc 29 and the solenoid 14 moving the armature so as to engage the disc 31 with the disc 30 so that the direction of rotation of the shaft 32 and thus of the shaft 23 is reversed.

Thus in order to adjust the duration of the multiple switch 22 in a particular position, one or other of the solenoids 13 or 14 is actuated so that the drive to shaft 32 is provided by either disc 29 or 30, the drive being transmitted as described to the traversing shaft 23. This moves the cam follower 24 into engagement with a different portion of the cylindrical cam surface so that upon rotation of the cam 15 the follower actuates the switch so as to give the required duration of the switch in that particular position. The multiple switch and its association with the remainder of the circuit illustrated in Fig. 1 will be more fully described hereinafter.

The temperature sensing unit 6 is made up of a bridge network 7 one arm of which is formed by two phases 8 and 9 of the star-connected bars and is switched in and out of circuit by means of the multiple switch 22 as will be later described. The remaining arms of the bridge are made up of resistances 7a, 7b and 7c. The junction (d) between the resistances 7a, and 7c is formed by a series-connected tapped resistance 41 which can be preset to the desired position so that balance of the bridge is obtained by any desired resistance value (and hence temperature) of the two phases 8 and 9 of the star-connected bars.

The contacts 42, 43 and 44, 45 of the multiple switch unit controls a D. C. supply for the temperature sensing unit 6, the supply being connected to the diagonally opposite junctions a and c of the bridge.

The coil 10a of the moving coil relay 10 is connected through an adjustable resistance 46 (for adjusting the relay sensitivity) to the tap provided in the series-connected tapped resistance 41 at junction d. The other side of the coil 10a is connected through the contacts 47 of the relay 48 to the junction b of the bridge. The relay-operated contacts are simultaneously closed when the bridge is energized. The moving coil relay contacts 49 and 50 are normally open, and, depending upon the direction of flow of current through the relay coil 10a, the contacts 49 or 50 are closed by the moving contact 10b so that the circuit is made to one or other of the solenoids 13 or 14 through the relays 11 or 12.

Thus the multiple switch when the follower 24 is in its lowest position closes the D. C. supply circuit to the bridge 7 and simultaneously through the contacts 51 and 52, connects the phases 8 and 9 (which are not being supplied with heating current) across the points a and b of the network.

The multiple switch is movable by the follower 24 into the position illustrated in Fig. 1 in which the switch is open circuit. When the switch is in the uppermost position, contacts 42 and 53 close so as to energize the coil 54 of a main relay 55 for the alternating current supply to the bars and mats of all the de-icer units.

The mats 4 of the de-icer units are supplied through the two relays 20 and 21, a proportion of the mats being supplied by one relay and the remainder by the other. The D. C. supply (h, j and k) to the operating coil of each of the relays passes through a pair of switches 56 and 57 actuated by the existing interrupter 19.

When fitted to an aeroplane the de-icing units are attached to or form the surface to be de-iced, and the de-icing unit which is selected for temperature sensing is that unit which is likely to reach the highest temperature under working conditions. The power supply to the other de-icing units is the same as that selected for temperature measurement. There is thus no danger of these units, the temperature of which is not measured, reaching a dangerously high temperature.

On account of the difficulty which might be experienced if the starting of the de-icing apparatus were left to the judgement of the pilot i. e. the pilot's estimation of the probable onset of icing conditions, a bi-metallic switch is located in a suitable position on the plane's fuselage so that when the temperature reaches, for example, plus 4° C. the bi-metallic switch closes so as to start the de-icing apparatus and the de-icing operation.

The function of the automatic temperature controlling apparatus just outlined will now be described. Closure of the bi-metallic switch starts the interrupter motor 18 which drives both the interrupter 19 and the cylindrical cam 15 through the gear box 17. Closure of the bi-metallic switch also excites the field of a 208 volt, 400 cycle, alternator forming part of the unit 3, so that the full voltage is available at the alternator terminals.

There are three stages in the cycle of events which take place during the de-icing operation. These will be briefly outlined before the specific operation of the apparatus is described.

In the first position of the cam follower 24 the multiple switch 22 is actuated so that the mats 4 and bars 2 of the de-icing units are heated. The duration of this heating time may vary, as will be hereinafter described, from three seconds to seventeen seconds. In the second position the multiple switch is adjusted by the cam 15 and follower 24 so that the mats and bars are disconnected from the A. C. supply, and in the third position the multiple switch is adjusted so that the temperature sensing unit 6 is connected across the two phases 8 and 9 of the bars of a single de-icing unit and so that any signal initiated by the moving coil relay 10 is transmitted to the adjustable-cam switching unit 5 whereby the position of the cam follower relative to the cam is adjusted according to the intelligence received from the relay 10. Thus, if any signal is received, when the next heating cycle commences (multiple switch in first position) the mats are heated for a greater or less time whereby the temperature of the de-icing bars 2 is maintained within desired limits, say between 90° C. and 100° C.

The operation of the de-icing apparatus will now be more particularly described from the point where the mats have experienced a full period of heating during which the temperature of the bars has risen to a temperature outside the desired range, say to 102° C.

The multiple switch 22 is then actuated by the follower 24 which falls on the cam surface to a level 15b at which all the contacts comprising the multiple switch are opened. The duration of this open circuit time is ½ second whatever the axial position of the follower 24 relative to the cam 15. The follower then falls to its lowest level 15c so as to close 42 and 43, 51 and 52 and 44 and 45 so as to supply the temperature sensing unit 6 with D. C. current and so as to connect the phases 8 and 9 of the bars 2 into the bridge network. The relay 48 is automatically actuated by the D. C. current supplied to the bridge and the contacts 47 are closed so that the coil 10a of the moving coil relay 10 is connected across the bridge junctions b and c. On account of the high temperature of the de-icer unit bars the moving coil relay contacts 49 and 10b are closed so that the relay 11 is closed in order to energise the solenoid 13 to move the armature 37 so that the discs 29 and 31 drivably engage. This rotates the traversing shaft 23 so that the follower 24 is moved to the right (see Fig. 1 or Fig. 3) across the cam surface so that when the de-icing unit is subsequently energised the heating time is reduced. The rotation of the traversing shaft continues so long as the "high" signal is transmitted from the moving coil relay. When the temperature of the bars drop to 100° C., the energisation of the moving relay 10 will not be sufficient to close the contacts 49 and 10b; the relay contacts open therefore and de-energise the solenoid 13. Further rotation of the cylindrical cam 15 after the duration of the temperature measuring time, which may be from 2½ to 16½ seconds, causes the follower 24 to rise so that after a delay of half a second, during which the switch is open circuit, contacts 42 and 53 are closed whereby the main relay 55 is closed. The de-icer bars and in addition the de-icer mats, should the contacts 56 and 57 be closed by the interrupter 19—then experience a further heating cycle the duration of which has been reduced to a time such that the temperature of the bars at the end of the heating cycle, providing the same icing conditions are experienced by the de-icing units, will be within the desired range.

Closure of the main relay 55 by the multiple switch 22 following each temperature sensing operation will always cause the de-icer bars 2 to be supplied with alternating current. This however is not the case with the de-icer mats 4, the supply to which as suggested earlier, is affected in addition by the interrupter 19, the contacts 56 and 57 of which are closed for 1 minute and open for 7 minutes. Thus apart from the intermittent supply of power to the mats caused by the multiple switch, the multiple switch itself is capable of supplying power to the mats for only 1 minute in each 8 minutes owing to the operation of the interrupter.

The operation of the de-icing equipment as just described refers to its operation while the de-icer bars are at a temperature of 102° C., i. e. when at 2° C. above the desired temperature range within which the bars are to be controlled. If however the temperature of the bars falls to, for example, 88° C., i. e. 2° C. below the range referred to, then the moving coil relay will transmit a "temperature low" signal to solenoid 14 which will actuate the armature 37 so that the discs 30 and 31 are engaged so that the follower 24 is moved to the left (see Figures 1 and 3) so as to engage a portion of the cam profile wherein on rotation of the cam, the multiple switch is actuated so that the de-icer mats experience a longer period of heating.

Thus automatic compensation for either a high or low temperature detected by the temperature sensing unit 6 is made by the adjustable-cam switch unit 5 so that the subsequent heating cycle, providing conditions remain stable, is adjusted in order to ensure that the de-icer unit is not either over- or under-heated.

When the cam follower is adjusted on the cam surface so that it actuates the multiple switch to give a maximum heating time, the speed of rotation of the cam should be such that the temperature of the de-icer bars during this time may not rise more than 5° C.

It is also important that the temperature sensing unit should be brought into operation shortly after the power supply to the de-icer units is interrupted. This ensures that the temperature detected is substantially the peak temperature of the de-icer bars or very nearly.

The temperature of the de-icer bars may be maintained within any desired temperature range other than that described above, i. e. from 90° C. to 100° C. Adjustment of the temperature range of the bars is effected by altering the tapping of the tapped series resistance 41 connected at the bridge junction d. The maximum temperature within the range chosen must be sufficiently below the maximum safe temperature to which any part of the de-icer unit may rise so that this maximum safe temperature will not be exceeded while the apparatus is stabilising itself after being switched on with the switching unit adjusted so as to supply the maximum amount of energy to the de-icer units. Under these circumstances the maximum temperature within the chosen range may be, for a short time, exceeded. The amount by which the maximum temperature within the chosen range should be below the maximum safe temperature of the de-icer unit in order to ensure safety will depend upon the overall response time of the apparatus to an excessive de-icer temperature.

Sensitivity of the moving coil relay, i. e. the extent of the temperature range, may be adjusted by varying the variable resistance 46 connected in series with the coil of the moving coil relay.

The moving coil relay 10 and also, if desired, the other relays connected in the circuit may be substituted by electronic relays, i. e. valves or thyratrons. Alternatively pneumatic relays may be used instead of solenoid-operated or electronic relays should this be more convenient.

It is necessary that the two phases of the de-icer bars used for temperature measuring should be made from a material having a satisfactory temperature coefficient of resistance such as Monel metal (Monel is a registered trademark). This metal is particularly suitable for the formation of one type of de-icing resistance which comprises the deposition of a metal on a flexible rubber insulating surface and etching the metal by means of a suitable acid so as to form a resistance grid. Monel metal is easily and satisfactorily etched.

It is possible, however, that on account of the application of the present invention to an existing de-icing system having heating elements made from a material having a negligible temperature coefficient of resistance, the existing elements cannot be used for temperature sensing by means of resistance change in the manner just described. In an alternative arrangement, illustrated in Fig. 5, the temperature sensing means comprises a separate resistance wire 58 made, for example, from Monel metal (R. T. M.) and located in close proximity to the phase 9 of the de-icer bars so as to be capable of conducting heat therefrom. The resistance wire 58 is connected to the contact 51 on the multiple switch (see Fig.

1), the lead to "f" being dispensed with. The other end of the resistance wire 58 is connected to the junction "a" in the bridge, the connection to "g" being dispensed with. The reference letters "e," "f" and "g" shown in Figure 5 correspond to the same letters shown in Figure 1.

The remainder of the de-icing apparatus is the same as that illustrated in Figure 1 and the operation of the apparatus is similar to that already described.

In a further alternative arrangement the resistance wire 58 is connected directly to the junctions "a" and "b" of the bridge the multiple switch being dispensed with. Temperature sensing by the bridge and consequent adjustment of the adjustable-cam switching unit is thus continuous.

Temperature sensing may also be effected by means of a thermo-couple 59 illustrated in Fig. 6 which shows a circuit which replaces the bridge network and constitutes an alternative means for actuating the moving coil relay 10.

The thermo-couple 59 is located in close proximity to the phase 9 and is connected in series with a cold couple and automatic compensating unit 65 and with a load resistance 60 and a resistance 61 forming part of a potentiometer 62. The potentiometer is connected through the resistance 63 to the points "c" and "d" illustrated in Fig. 1, the contacts 51 and 52 of the multiple switch 22 and the temperature sensing bridge shown in Fig. 1 being dispensed with. An electronic amplifier 64 is connected across the load resistance 60 and is for supplying an amplified current to the relay coil 10a. The relays 11 and 12 connected to the moving coil relay 10 correspond to the similarly numbered relays in Fig. 1 and are for the same purpose, i. e. actuating the adjustable-cam switching unit.

The operation of this thermo-couple arrangement is as follows. A D. C. current which flows along "c" and "d" when the contacts 44 and 45 and the contacts 42 and 43 are closed (see Fig. 1) flows through the resistance 63 and potentiometer 62. The potentiometer is adjusted so that the potential difference across the portion 61 of the potentiometer is substantially equal and opposite in direction to the potential set up by the thermo-couple 59 when the thermo-couple is at a temperature within the predetermined control range. Thus substantially no current will flow in the load resistance 60 and the relay 10 will not be actuated. When the temperature of the thermo-couple rises or falls to a temperature outside the said range, a resultant current will flow in the load resistance which will be amplified by the amplifier 64 and actuate the relay 10. The operaiton of the relay will then be as previously described.

In an alternative thermo-couple arrangement to that described above, the D. C. supply is connected directly to wires "c" and "d" shown in Fig. 6 so that the multiple switch 22 (Fig. 1) is not connected in circuit. Temperature sensing by the thermo-couple and consequent adjustment of the adjustable-cam switching unit is thus continuous.

In a further alternative embodiment illustrated in Fig. 4 the means for moving the traversing unit axially relative to the cylindrical cam comprises a screwthreaded shaft 23 with which the unit engages as shown in Fig. 3 and a reversing device 66 through which the shaft is driven via the gear 67. A solenoid 13 is provided for moving the device 66 so that the gears 68 and 69 drive the gear 67 and a solenoid 14 is provided so that the gears 68, 70 and 71 drive the gear 67 in the opposite direction. The gear 68 itself driven through the shaft 75 by the gears 72 and 73. Gear 73 also drives the gear 74 which is attached to the shaft 76 for driving the cam 15.

An alternative method of actuating the multiple switch 22 is illustrated in Fig. 2. The inclined disc 77 is rigidly attached to a driving spindle 78, and the multiple switch 22 is mounted on a rotatable spindle 79. The cam follower 24 is movable by the spindle 79 in an arc across the surface of the inclined disc 77. A mechanism 80 similar to that shown in Fig. 3 is provided for oscillating the spindle 79, a worm wheel 81 and quadrant 82 being provided instead of the crown wheels 35 and 36 shown in Fig. 3. Leaf springs 83 and 84 serve to re-engage the quadrant 82 and worm wheel 81 should they become disengaged. When the follower 24 is moved radially outwardly across the surface of the disc 77, the switch 22 is closed in its upper position for a longer period than before the movement of the follower and vice versa.

Figure 7 illustrates a still further embodiment in which a signal from the relay 10 is caused to actuate a device 85 for controlling the direction of rotation of a servo-motor 86. The servo-motor reversably drives a screw-thread 87 which moves a sliding connection across a variable resistance 88 connected in the field circuit of an alternator incorporated in the generation unit so as to vary the voltage supplied to the relay 55 actuated by a relay coil 54.

Provision may also be made for adjusting the make-to-break time ratio of the cam-operated interrupter 19 which interrupts the supply to the mats 4, so that, should de-icing conditions be particularly severe, the make-to-break ratio can be adjusted whereby the mats experience a longer heating period than the normal period of 1 minute in every 8 minutes—say 1 minute in every 5. There is thus a shorter time (4 minutes as opposed to 7) during which ice may form on the mats.

This adjustment may be effected by providing a solenoid-operated gear change in the gear box which can be operated by the pilot in order to adjust the speed of rotation of the cam-operated interrupter 19 so as to give the shorter time ratio.

In an alternative embodiment the cam-operated switch mechanism is replaced by a mechanism comprising a rotatable cylindrical drum having part of its surface insulated and the remainder conductive, and an associated contact for completing the circuit to an electromagnetic switch relay for operating a multiple switch connected in the de-icing circuit as already described. Means are provided for moving the contact axially relative to the drum so that the circuit switch to the switch relay is broken by the insulated portion of the drum so that the make-to-break time is varied according to the position of the contact relative to the drum.

Having described our invention what we claim is:

1. Apparatus for regulating the supply of energy to a heating element which comprises a bridge network having a pair of electric circuits in parallel, one circuit comprising a pair of fixed resistances in series and the other comprising a fixed resistance in series with a temperature variable resistance in temperature responsive relation to said heating element and a bridge circuit from the junction of said temperature responsive resistance and said fixed resistance to the junction of said fixed resistances in the other circuit, a timer to supply electric current to said heater at timed intervals, an electric circuit having a pair of branches in parallel, means controlled by one of said branch circuits to lengthen the period of supply of current to said heater and controlled by the other of said branch circuits to shorten the period of supply of current to said heater and a two-way relay controlled by said bridge circuit to open and close said branch circuits alternately as current passes in one direction or the opposite direction through said solenoid.

2. Apparatus according to claim 1 wherein the timer comprises a three-position multiple change-over switch having one position in which the switch closes a circuit from the element supply to the element, an intermediate position in which all the switch contacts are open circuited and a third position in which the switch contacts close the direct current supply to the potentiometer, a switch actuating member in the form of a cam follower, a rotatable switch cam for moving the switch from one position to another in succession, means for rotating the cam and means operated by the two-way relay for adjusting the relative positions of the cam and cam follower whereby the element supply circuit is closed for periods varying inversely as the temperature of the heating element.

3. Apparatus according to claim 1 in which said timer comprises a switch for interrupting the heating element supply circuit, a switch-actuating cam follower for periodically actuating the switch, a rotatable switch cam comprising a disc having a plane surface inclined to the axis of rotation, the said surface upon rotation of the cam contacting the follower in order to actuate the switch, and means for moving the switch and follower relative to the cam whereby the follower is associated with a different portion of the cam so that upon rotation of the cam the duration of the switch interruption period is variable.

4. Apparatus according to claim 3 wherein the switch is rigidly attached to a shaft mounted so that the follower is movable in an arc across the cam surface.

5. The apparatus of claim 1 in which the timer comprises a switch for interrupting the heating element supply circuit, a switch actuating member comprising a cam follower for periodically opening and closing said switch, a rotatable cylindrical cam comprising a cylindrical surface of lesser radius and a cylindrical surface of greater radius partially overlying said surface of lesser diameter and widening progressively from a place on said surface of lesser diameter to a place displaced longitudinally therefrom and means actuated by said two way relay to shift said follower longitudinally of said cam.

6. Apparatus according to claim 5 wherein the switch is movable by means of a screwthreaded traversing shaft.

7. The apparatus of claim 5 wherein the follower is movable relative to the cam by means of a reversing device comprising a pair of discs rigidly mounted on a shaft in spaced apart relationship, means for driving the shaft, a third disc carried on one end of a second shaft and located between the pair of discs with its axis of rotation at right angles thereto, said shaft being drivably connected by means of a universal joint to means for moving the switch relating to the cam and being carried in an armature between the universal joint and the third disc the said armature being movable by means of one or other of a pair of solenoids so that the third disc engages one or other of the pair of discs.

8. The apparatus of claim 1 in which said temperature variable resistance forms a part of a heating element, and which apparatus comprises a switch to connect said part of said heating element into said branch of said divided circuit when said timer interrupts said heating elements and disconnects it from said circuit when said heating element is connected.

9. The apparatus of claim 1 in which said timer comprises a heat element control switch operating cam having areas of different interrupting cycles and a shifting element controlled by said two-way relay to shift said switch from one area to another as said relay moves in one way to the other.

10. The apparatus of claim 1 and a heating element comprising spaced bars electrically heated between interrupted periods of said timer and heating grids between said bars and means to interrupt said heating grids periodically between said interrupted periods of said timer.

11. The apparatus of claim 10 in which said heating bars are connected in a Y circuit and said grids are connected in a Δ circuit.

12. Apparatus for regulating the temperature of an electrical heating element comprising a two-way relay, means responsive to the temperature of the element for controlling the direction of flow of current through the relay, a circuit comprising a switch for cyclically interrupting the supply of current to said heating element, a switch for controlling the energizing of the means responsive to the element temperature, means for actuating the switches so as periodically to switch off the element supply and switch on the means responsive to the element temperature and means intermittently operable by the relay and connected in the heating element supply circuit for automatically adjusting the circuit so as to control the amount of electrical energy per cycle supplied to the heating element when the element supply is restored whereby the temperature thereof is maintained within a predetermined range.

13. Apparatus for regulating the temperature of an electric resistance heater element comprising a bridge network, at least part of the heater resistance having a temperature coefficient of resistance other than zero and being at least part of one of the bridge resistances, a two-way relay connected to the bridge network so as to be controlled by the out-of-balance current set up therein, a timer comprising a switch for cyclically interrupting the supply of current to said heater, a circuit comprising a switch for energizing the bridge network, a switch to connect said resistance into said bridge network and means for actuating the switches so as periodically to switch off and on the element supply substantially as the bridge network is energized and de-energized respectively and substantially as said resistance is connected into and disconnected from respectively said bridge network, and means operable by the relay and connected in the element supply circuit for automatically adjusting the circuit so as to control the amount of electrical energy per cycle supplied to the element after the element supply has been restored whereby the temperature thereof is maintained within a predetermined range.

14. Apparatus according to claim 13 wherein the interrupter switch, the bridge energizing switch and the switch to connect the resistance into the bridge network are constituted by a three-position multiple change-over switch having one position in which it closes a circuit from the element supply to the element, an intermediate position in which all its contacts are open circuited, and a third position in which its contacts close the D. C. supply to the bridge network and connect the resistance into the bridge network, a switch actuating member in the form of a cam follower, a rotatable switch cam for moving the switch from one position to another in succession, means for rotating the cam and means operated by the two-way relay for adjusting the relative positions of the cam and cam follower whereby the element supply circuit is closed for periods varying inversely as the temperature of the heating element.

15. The apparatus of claim 13 in which said switch for cyclically interrupting the supply of current to said heater comprises a rotatable disc having a plane surface inclined to the axis of rotation, a switch actuating cam follower contacting said disc at a distance from its center to be moved axially of the rotation of said disc and means for moving said follower radially inwardly or outwardly of said disc to vary the periods of opening and closing of said switch.

16. The apparatus of claim 13 in which the means for actuating the switch for cyclically interrupting the supply of current to the heater comprises a rotatable cylindrical cam having a surface of lower radius and a surface of higher radius extending progressively over the surface of lower radius from a point on the periphery of said cam, a cam follower contacting the surface of said cylindrical cam and actuating said switch and means for moving the follower axially relative to the cam to vary the periods of opening and closing the switch.

17. The apparatus of claim 15 wherein the means for moving the follower of the cam comprises a reversing mechanism having a driving shaft for said disc a pair of discs rigidly mounted on said shaft in spaced apart relationship, means for driving the shaft, a second shaft to drive said driving shaft having a third disc mounted thereon and located between the pair of discs at right angles to the axis of said first shaft and movable to bring the third disc alternately into contact with each of the discs of said pair of discs on said driving shaft, said second shaft being operatively connected to said cam follower to move it axially of said cylindrical cam.

18. The apparatus of claim 13 having a heating element comprising spaced bars electrically heated between interrupted periods of said timer and heating grids between said bars and means to interrupt said heating grids periodically between said interrupted periods of said timer.

19. The apparatus of claim 18 in which said heating bars are connceted in a Y circuit and said grids are connected in a Δ circuit.

References Cited in the file of this patent

UNITED STATES PATENTS

| | | |
|---|---|---|
| 1,715,750 | Gano | June 4, 1929 |
| 1,798,678 | Keller | Mar. 31, 1931 |
| 2,220,028 | Smith | Oct. 29, 1940 |
| 2,510,041 | Rudahl | May 30, 1950 |
| 2,568,411 | Reed | Sept. 18, 1951 |
| 2,594,984 | Penther et al. | Apr. 29, 1952 |
| 2,608,635 | Mershon | Aug. 26, 1952 |
| 2,616,018 | Karp et al. | Oct. 28, 1952 |